United States Patent

[11] 3,618,990

| [72] | Inventor | Jay F. Falke |
| | | Adrian, Mich. |
| [21] | Appl. No. | 841,627 |
| [22] | Filed | July 14, 1969 |
| [45] | Patented | Nov. 9, 1971 |
| [73] | Assignee | Primore Sales, Inc. |
| | | Adrian, Mich. |

[54] TUBE COUPLING
11 Claims, 5 Drawing Figs.

[52] U.S. Cl.................................................. 285/343,
285/158, 285/353, 285/382.7, 285/DIG. 2, 138/89
[51] Int. Cl............................................................ F16l 19/00
[50] Field of Search.......................................... 285/343,
382.7, 3, 341, 342, 353, 12, 158, 219, 212

[56] References Cited
UNITED STATES PATENTS

| 3,003,795 | 10/1961 | Lyon............................ | 285/382.7 X |
| 2,452,277 | 10/1948 | Woodling...................... | 285/343 |
| 2,466,526 | 4/1949 | Wolfram....................... | 285/382.7 X |
| 2,727,763 | 12/1955 | Ziep............................. | 285/342 |
| 2,739,373 | 3/1956 | Kane............................ | 285/353 X |
| 2,857,176 | 10/1958 | McTaggart et al........... | 285/382.7 X |
| 3,425,452 | 2/1969 | Shaw............................ | 285/12 X |

FOREIGN PATENTS

| 1,288,520 | 2/1962 | France......................... | 285/341 |
| 86,771 | 7/1936 | Sweden........................ | 285/343 |

Primary Examiner—Thomas F. Callaghan
Attorney—Barnes, Kisselle, Raisch & Choate

ABSTRACT: A refrigeration tubing coupling for connecting deformable tubing to a refrigeration unit or to another length of refrigeration tubing. The coupling comprises two bodies having openings therein, one of the bodies has an annular projection which engages a surface on the second body and is deformed radially inwardly upon axial movement of the bodies toward one another to clamp the tubing and form the seal.

PATENTED NOV 9 1971
3,618,990
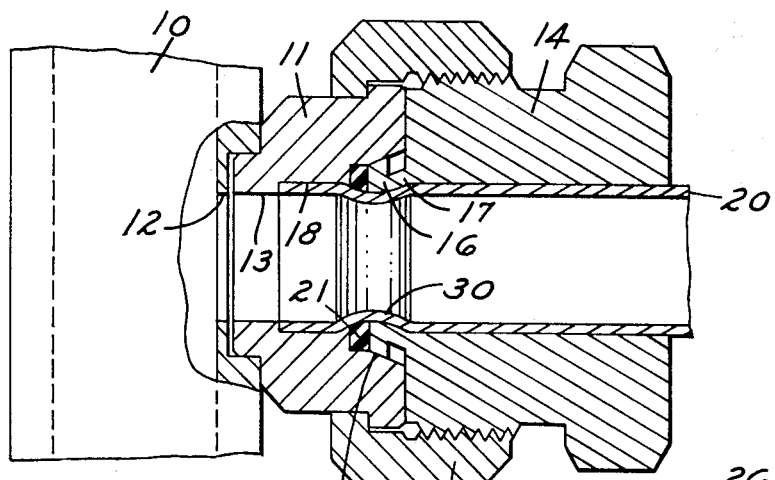
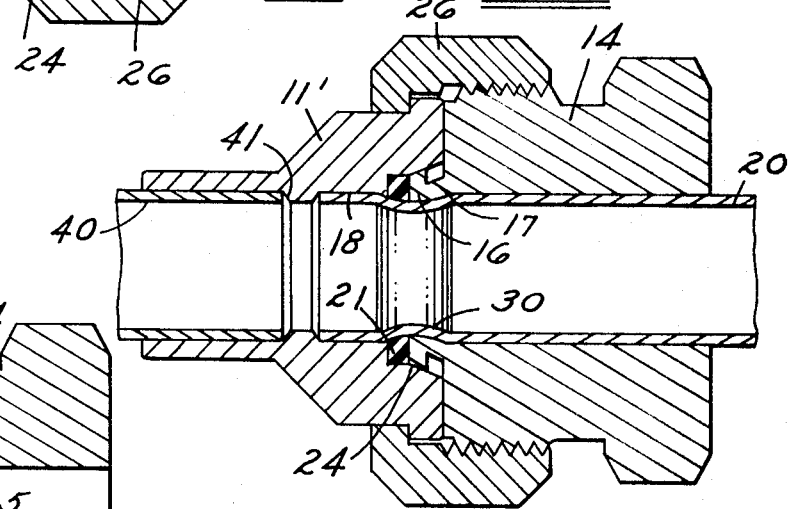
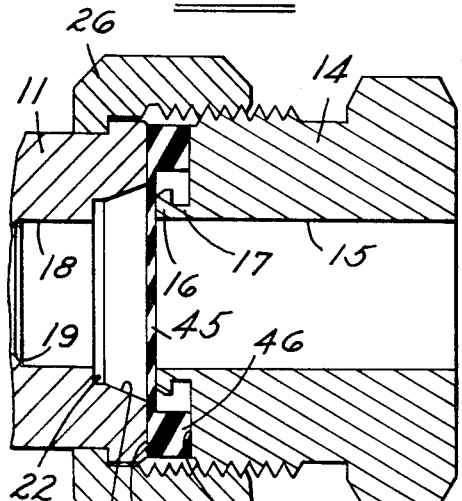
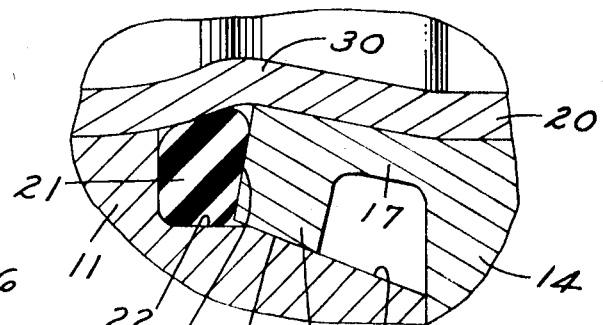
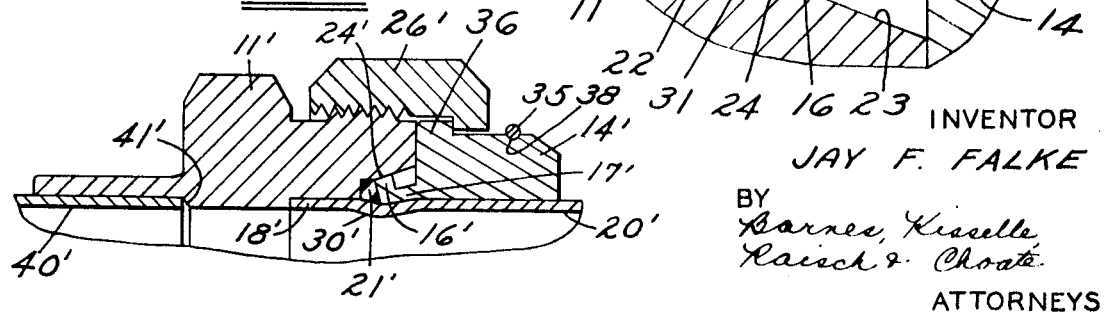
INVENTOR
JAY F. FALKE
BY
Barnes, Kisselle
Raisch & Choate
ATTORNEYS

TUBE COUPLING

This invention relates to tube couplings for connecting tubing or conduits and particularly a tube coupling for connecting tubing and conduits to a refrigeration unit or to another conduit.

In forming couplings between tubing and a refrigeration unit or another length of tubing, one of the problems is that the coupling may not form a permanent gas-type connection which maintains the gas-type condition through various temperature changes, vibration and the like.

Among the objects of the invention are to provide a new ans simple inexpensive tubing coupling; which provides a positive seal both on the components and the tubing; which can be disconnected and recoupled; which has a positive alignment of the components; which is not subject to adverse effects by vibration; which forms a seal with a deformable length of tubing, which deformity is of predetermined size and shape, free of sharp indentations which would lead to a low fatigue life of the tubing; which does not require special preparation of the tubing; which provides for positive control both radially and longitudinally of the tubing position; which has minimum effect upon flow of refrigerant through the coupling and which utilizes metal-to-metal contact between components thereby minimizing blowouts due to temperature differential.

SUMMARY OF THE INVENTION

A tubing coupling for connecting deformable tubing to a refrigeration unit or to another length of refrigeration tubing. The coupling comprises two bodies having openings therein, one of the bodies has an annular projection which engages a surface on the second body and is deformed radially inwardly upon axial movement of the bodies toward one another to clamp the tubing and form the seal.

DESCRIPTION OF THE DRAWINGS

FIG. 1 is a fragmentary part sectional view of a refrigeration unit embodying the novel coupling.

FIG. 2 is a fragmentary longitudinal sectional view of a modified form of the invention.

FIG. 3 is a fragmentary sectional view of the invention shown in FIG. 2 prior to full assembly.

FIG. 4 is a fragmentary sectional view on an enlarged scale of a portion of the couplings shown in FIGS. 1 and 2.

FIG. 5 is a fragmentary longitudinal sectional view of a modified form of the invention.

Referring to FIG. 1 a refrigeration unit 10 such as a compressor has a fitment 11 fixedly mounted thereon. Unit 10 and fitment 11 have aligned openings 12, 13.

The coupling further includes a fitment 14. As shown in FIG. 3, the fitment 14, prior to assembly, comprises a body having an opening 15 of constant diameter extending therethrough. Fitment body 14 includes an annular projection 16 at one end thereof which is connected to the body by a portion 17 of reduced radial cross section.

Opening 13 in fitment 11 has a portion 18 of reduced cross section providing a shoulder 19. A tube 20 of deformable material and of substantially the same diameter as opening 15 is inserted through the fitment body 14 with its end in engagement with the shoulder 19 of fitment 11. Prior to placement of the fitting 14 against the shoulder 19 a sealing gland 21, such as an O-ring, is provided over the tubing. The fitment 11 includes an annular groove 22 at one end of the opening 18 and an outwardly tapered surface 23 extending from the groove to the end of the fitment 11. The annular projection 16 of fitment body 14 includes an outer tapered surface 24 forming a greater angle with the axis of the fitment 14 than the surface 23 of fitment 11.

Fitment 14 is formed with threads 24 there engaged by threads 25 of a nut 26 that is mounted of the fitment 11. Nut 26 includes a flange 27 that engages the shoulder 28 on the fitment 11 to limit the axial movement of the nut 26.

When the tubing 20 is in position and the nut 26 is threaded onto the fitment 14, the surfaces 23, 24 engage. Further rotation of the nut 26 causes axial movement of the fitments 11, 14 to deform the annular projection 16 radially inwardly. This in turn deforms the tubing as at 30 (FIGS. 1 and 4) radially inwardly to mechanically lock the fitment 14 on the tubing. As shown in FIG. 4, the movement axially of the projection 16 toward the fitment 11 compresses the sealing gland 21 to form a seal between the tubing 20 and the sealing gland as well as between the fitment 11 and the sealing gland 21 at shoulder 22 and between the end surface 31 of the projection 16 and the sealing gland 21.

The extent of radial deformation of projection 16 as well as force of the seal is controlled by abutment of radial surfaces 33, 34 on the fitments 11, 14. When the surfaces 33, 34 abut, the fitments 11, 14 are mechanically coupled together providing a rigid connection that is not subject to vibration.

The degree of torque required to complete the deforming and locking of the coupling is dependent upon the thickness and axial width of the reduced portion 17 which connects the annular projection 16 to the body 14. If the thickness and axial width are reduced excessively, proper deformation will not occur. If the thickness and axial width are too great, a greater amount of torque will be required.

In the form of the invention shown in FIG. 2, the fitment 11' is adapted to be connected to a second length of tubing 40 which engages a second shoulder 41 in the fitment and is fixed to the fitment as by soldering or the like. The coupling is otherwise identical in construction to that shown in FIGS. 1 and 4.

Where it is desired to ship a refrigeration unit with a length of tubing attached thereto and with a charge of refrigerant in the unit, a secondary minute seal 45 having an enlarged annular peripheral portion 46 can be provided between two fittings 11, 14 as shown in FIG. 3 to maintain the refrigeration in the unit. The refrigeration unit would have a shutoff valve at some point between the fitting 11 and the unit. At the point of attachment to a refrigeration system, the tubing is evacuated, the secondary minute seal 45 removed and the parts of the coupling assembled as in the previous forms of the invention. Seal 45 prevents accidental tightening of the mating parts prematurely while actually sealing and preventing the parts from working loose during handling and shipping.

In the form of the invention shown in FIG. 5, the nut 26 is rotatably mounted on fitment 14' instead of fitment 11'. A flange on nut 26' engages a complementary flange 36 on fitment 14'. In this form, a snap ring 35 is set in annular groove 37 to retain the nut 26' on the fitment 14'. In all other respects, the structure is such as that shown in FIG. 2 and corresponding numbers have been used with a prime notation in FIG. 5.

I claim:

1. A tubing coupling comprising
a length of tubing,
a first fitting body having an opening therethrough for receiving a tubing,
said first fitting body having an annular deformable projection at one end thereof,
said end of said projection having an outer annular surface tapered outwardly toward said body and a continuous annular surface engaging said tubing,
a second fitting body having an opening therethrough,
said opening having a shoulder receiving one end of the tubing extending through said first fitting body,
a sealing gland of resilient material,
said second fitting body having an annular groove surrounding said tubing and spaced axially from said shoulder,
said groove opening axially outwardly toward said sealing gland,
said second fitting body having an annular surface adjacent one end of the opening therein which is tapered outwardly toward said one end of said second fitting body, said tapered surface on said second fitting body extending from the outer periphery of said groove to the said one end of said second fitting body, said sealing gland being positioned on said tubing and interposed in said annular groove of said second fitting body between the end of said annular deformable projection and said second fitting body, interengaging means between said fitting bodies for drawing said bodies axially relatively toward one another whereby said outer annular surface of said annular projection and said tapered surface of said second fitting body interengage to deform the end of the annular projection radially inwardly and in turn cause said continuous annular surface on said first fitting body to deform the tubing radially inwardly and said sealing gland is compressed between the end of said projection, said second body and said tubing, said fitting bodies having interengaging generally radial surfaces for limiting the axial movement of said bodies toward one another and thereby limiting the extent of deformation of said annular projection and said tubing radially inwardly.

2. The combination set forth in claim 1 wherein the end of said annular projection on said first fitting body is connected to said first fitting body by an annular portion of reduced radial thickness defined by an annular groove on the periphery thereof.

3. The combination set forth in claim 1 wherein said opening in said first fitting body has a substantially constant diameter prior to deformation of said annular projection which is substantially equal to the outer diameter of said length of tubing.

4. The combination set forth in claim 1 wherein said sealing gland comprises an O-ring.

5. The combination set forth in claim 1 wherein the maximum radial thickness of said annular projection is greater than the minimum diameter of the tapered surface on said second fitting body.

6. The combination set forth in claim 1 wherein the outer annular surface of said projection forms a greater angle with the axis of the coupling than the annular surface of the second body.

7. A tubing coupling comprising
a first fitting body having an opening therethrough for receiving a length of tubing,
said body having an annular deformable projection at one end thereof,
said projection having an outer annular surface tapered outwardly toward said body and a continuous annular surface adapted to engage said tubing,
a second fitting body having an opening therethrough,
said opening adapted to receive one end of the tubing extending through said first fitting body,
a sealing gland of resilient material,
said second fitting body comprising an annular groove adapted to surround said tubing on which said sealing gland is to be positioned,
said groove opening axially outwardly toward said sealing gland,
said second fitting body having an annular surface adjacent one end of the opening therein which is tapered outwardly toward said one end,
said tapered surface on said second fitting body extending from the outer periphery of said groove to the said one end of said second fitting body,
said sealing gland interposed in said annular groove of said second fitting body between the end of said annular deformable projection and said second fitting body,
interengaging means between said fitting bodies for drawing said bodies axially relatively toward one another whereby said outer annular surface of said annular projection and said tapered surface of said second fitting body interengage to deform the end of the annular projection radially inwardly and in turn cause said continuous annular surface on said first fitting body to deform the tubing radially inwardly and said sealing gland is compressed between the end of said projection, said second body and said tubing,
said fitting bodies having interengaging generally radial surfaces for limiting the axial movement of said bodies toward one another and thereby limiting the extent of deformation of said annular projection and said tubing radially inwardly.

8. The combination set forth in claim 7 wherein the end of said annular projection on said first fitting body is connected to said body by an annular portion of reduced radial thickness.

9. The combination set forth in claim 7 wherein said sealing gland comprises an O-ring.

10. The combination set forth in claim 1 wherein said opening in said first fitting body has a substantially constant diameter prior to deformation of said annular projection.

11. The combination set forth in claim 1 wherein the outer annular surface of said projection forms a greater angle with the axis of the coupling than the annular surface of the second body.

* * * * *